United States Patent [19]

Burcham

[11] 4,300,656
[45] Nov. 17, 1981

[54] MULTIPLE PURE TONE ELIMINATION STRUT ASSEMBLY

[75] Inventor: Frank W. Burcham, Lancaster, Calif.

[73] Assignee: The United States of America as represented by the Administrator of the National Aeronautics and Space Administration, Washington, D.C.

[21] Appl. No.: 185,869

[22] Filed: Sep. 11, 1980

[51] Int. Cl.³ .............................................. B64D 33/02
[52] U.S. Cl. .................................................. 181/214
[58] Field of Search ............... 181/213, 214, 219, 224, 181/229, 222, 215–218, 220; 137/15.1, 15.2; 415/119; 60/270 R

[56] References Cited

U.S. PATENT DOCUMENTS

| | | | |
|---|---|---|---|
| 3,080,707 | 3/1963 | Vetter | 137/15.1 |
| 3,363,421 | 1/1968 | Ferri | 60/270 R X |
| 3,426,981 | 2/1969 | Allcock | 137/15.1 X |
| 3,477,231 | 11/1969 | Paulson | 181/214 X |
| 3,483,881 | 12/1969 | Pike et al. | 137/15.2 |
| 3,511,337 | 5/1970 | Pease et al. | 181/214 X |
| 3,583,417 | 6/1971 | Clark et al. | 181/214 X |
| 3,610,262 | 10/1971 | Wise | 181/214 X |
| 3,710,889 | 1/1973 | Lamy | 181/214 |
| 3,819,008 | 6/1974 | Evans et al. | 181/214 |
| 3,829,237 | 8/1974 | Chesstnutt | 137/15.1 X |
| 3,908,683 | 9/1975 | Demetrick | 137/15.1 |

Primary Examiner—L. T. Hix
Assistant Examiner—Benjamin R. Fuller
Attorney, Agent, or Firm—Paul F. McCaul; John R. Manning

[57] ABSTRACT

An acoustic noise elimination assembly having a capability for disrupting the continuity of fields of sound pressures forwardly projected from fans or rotors of a type commonly found in the fan or compressor first stage for air-breathing engines, when operating at tip speeds in the supersonic range. The assembly incudes a tubular cowl 12 defining a duct for delivering an airstream axially into the intake for a jet engine E and a sound barrier 14, defined by a plurality of intersecting flat plates or struts 14a–14d having a line of intersection coincident with a longitudinal axis of the tubular cowl, which serves to disrupt the continuity of rotating fields of multiple pure tonal components of noise.

3 Claims, 2 Drawing Figures

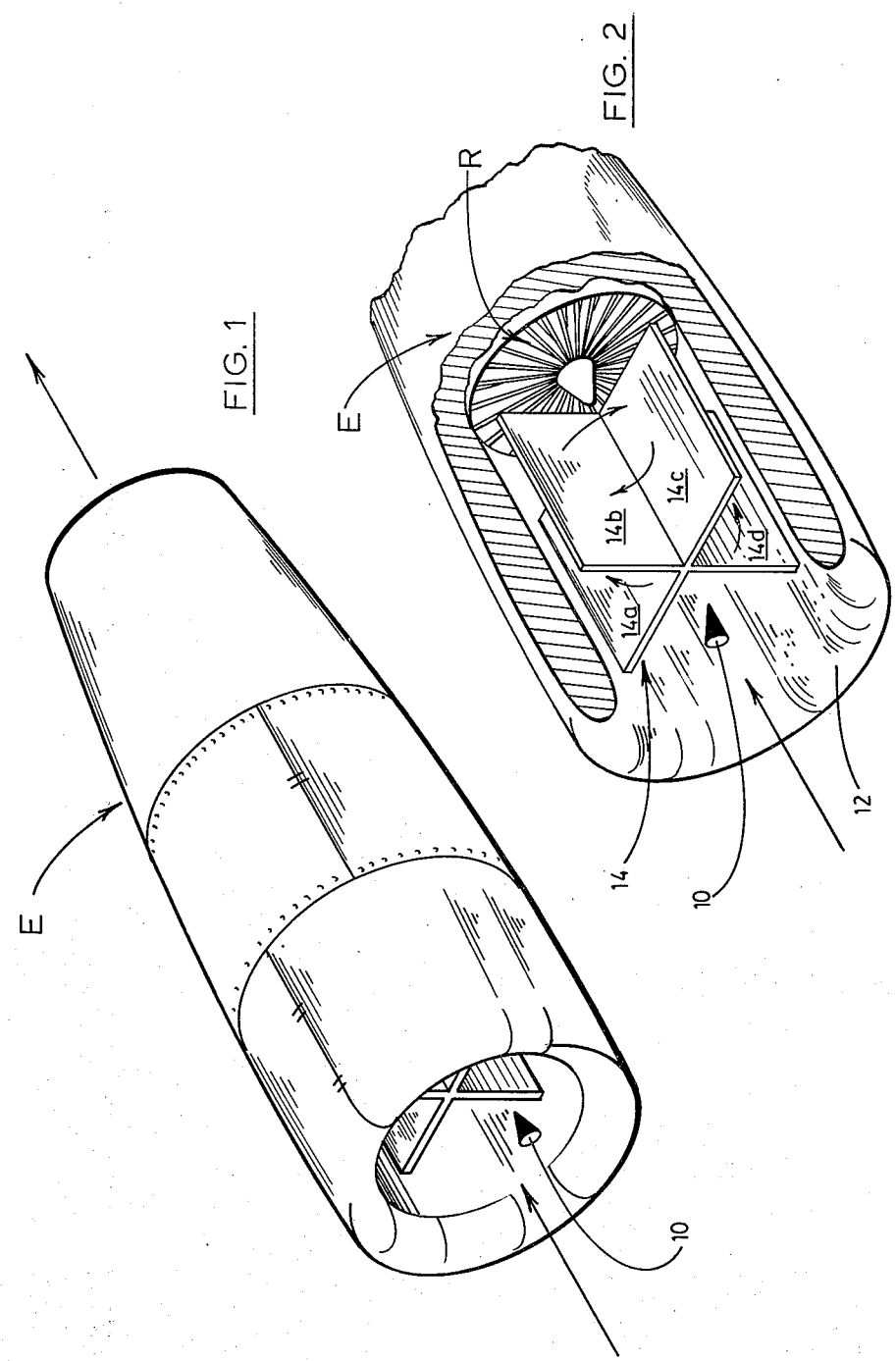

MULTIPLE PURE TONE ELIMINATION STRUT ASSEMBLY

ORIGIN OF THE INVENTION

The invention described herein was made in the performance of work by employees of the United States Government and may be manufactured and used by or for the Government for Governmental purposes without the payment of any royalties thereon or therefor.

BACKGROUND OF THE INVENTION

1. Field of the Invention

As is known, rotors or fans for the first stage of large jet engines operate at speeds such that the tips of the blades thereof attain a velocity or "tip speed" in the supersonic range. Moreover, from these fans or rotors, when operational at supersonic velocities, there eminates a rotating field of sound pressure containing pure tone components of noise. Simply by eliminating these tonal components it is possible to reduce the noise level for jet aircraft by several decibels.

The invention generally relates to acoustic noise suppression devices for use in combination with air-breathing engines, and more particularly to a pure tone elimination assembly adapted to be mounted upstream from the air intake for a jet engine and employed for disrupting the continuity of forwardly projected, rotating fields of pure tonal sound pressure as they eminate from the engine.

2. Description of the Prior Art

During the course of a search conducted for the invention, hereinafter more fully described and claimed, the following patents were discovered:

| | | |
|---|---|---|
| 3,080,707 | Vetter | March 12, 1963 |
| 3,363,421 | Ferri | January 16, 1968 |
| 3,426,981 | Allcock | February 11, 1969 |
| 3,477,231 | Paulson | November 11, 1969 |
| 3,483,881 | Pike et al | December 16, 1969 |
| 3,511,337 | Pease et al | May 12, 1970 |
| 3,583,417 | Clark | June 8, 1971 |
| 3,610,262 | Wise | October 5, 1971 |
| 3,710,889 | Lamy | January 16, 1973 |
| 3,829,237 | Chestnutt | August 13, 1974 |
| 3,908,683 | Demetrick | September 30, 1975 |

As is known, the noise produced by jet engines operating with supersonic relative tip speeds, in the fan or compressor first stage thereof includes multiple pure tone components forwardly propagated as a rotating field of sound pressure. Previously, such multiple pure tone noise has been attenuated with devices such as liners provided in the inlet. Such techniques, at best, tend to be partially effective and thus fail to meet existing needs.

Substantially all of the patents discovered during the course of the search contain disclosures of plates, vanes, or struts disposed in an intake flow path for a jet engine, excepting the patents to Pease et al and Ferri. However, in each instance, the purpose of the plates or vanes, as disclosed, is to "choke" or vary the velocity of the air flow for purposes of imparting supersonic speed to the flow for thus creating a sound barrier, particularly when the engine is operating at low power settings. This technique also fails to meet existing needs for various reasons, not the least of which are those which can be expected to attend the reduction in intake capacity for the engine. The patent to Pease et al, of course, discloses a noise attenuator for a gas turbine, wherein attenuation is effected by sound absorbing plates having off-set sections for deflecting the noise path, and the patent to Ferri discloses a ram-jet engine. The teachings of these patents are not deemed relevant. It is, therefore, believed that the prior art is devoid of any suggestion of the invention hereinafter more specifically described and claimed.

It is the general purpose of the instant invention to provide a practical, pure tone elimination assembly in combination with the upstream or air intake for a jet engine, having a bladed rotor characterized by tip speeds in the supersonic range.

OBJECTS AND SUMMARY OF THE INVENTION

It is an object of the instant invention to provide an improved, acoustic noise elimination assembly for use in combination with jet engines.

It is another object to provide a pure-tone elimination assembly having a capability for disrupting the continuity of a forwardly projected, rotating field of sound pressure developed by fans or rotors, commonly found in the fan or compressor first stage for air-breathing engines, when operating at tip speed in the so-called supersonic range.

These and other objects and advantages are achieved through the use of a pure-tone elimination assembly including a tubular cowl defining a duct for delivering an air stream axially into the air intake for a jet engine or the like, and a plurality of flat, plate-like members arranged in mutually intersecting planes having a line of intersection coincident with the longitudinal axis of said tubular cowl for disrupting the continuity of a rotating field of multiple pure tone components of noise, as will become more readily apparent by reference to the following description and claims in light of the accompanying drawings.

DESCRIPTION OF THE DRAWINGS

FIG. 1 is a perspective view depicting a jet or similar air-breathing engine having mounted thereon a multiple, pure-tone elimination assembly embodying the principles of the instant invention.

FIG. 2 is a fragmented, perspective view, on somewhat of an enlarged scale more clearly illustrating the assembly shown in FIG. 1.

DESCRIPTION OF THE PREFERRED EMBODIMENT

Referring now to the drawings, with more particularity, wherein like reference characters designate like or corresponding parts throughout the several views, there is shown in FIG. 1 a jet engine, generally designated E and having a bladed rotor R, equipped with a pure tone elimination assembly, generally designated 10, which embodies the principles of the instant invention.

With reference to FIG. 2, it can be seen that the multiple pure tone elimination assembly 10 includes a tubular cowl 12 projected forwardly from the blades of the rotor R for the engine E. Hence, it should be appreciated that the air stream entering the inlet of the engine E first is caused to flow axially through a tubular cowl 12.

Within the cowl 12 there is disposed a sound barrier, generally designated 14. The barrier 14 is affixed or anchored in the cowl 12 and is employed to disrupt the continuity of the rotating noise field propagated from the tips of the rotor R. Thus the barrier serves to eliminate the multiple pure tones as they eminate from the engine E. As a practical matter, the barrier 14 is, where so desired, employed also for purposes of mechanically supporting the cowl, and thus the barrier renders a dual function.

As shown in the drawings, the barrier 14 includes four struts, designated 14a–14d. These struts are arranged to form a cruciform and intersect along a line coincident with the longitudinal axis of symmetry for the cowl 12. In practice, it has been found that the dimension of the struts along their lines of intersection preferably is equal to the diameter of the rotor R.

It should also be apparent that in many instances it may be more advantagous to use three or even two struts of greater lengths for purposes of achieving a similar result while yet reducing weight. In any event, tthe barrier 14 is positioned upstream from the rotor R and is of a length sufficient to disrupt the rotating field of multiple pure tones, sufficiently for preventing the field from redeveloping upstream from the barrier 14. Thus the noise developed by the tips of the rotor R, at supersonic speeds, is attenuated fro thereby greatly reducing the level of the objectionable noise which attends the operation of the rotors or fans employed in jet engines, particularly those commonly referred to as "larger" jet engines for "heavy" aircraft.

It is believed that in view of the foregoing description, the operation of the invention herein disclosed and claimed readily is apparent as it suffices to understand that a rotating field of multiple pure tones propagated by the tips of the rotor R, operating at supersonic speeds, is disrupted and then prevented from reassembling upstream from the barrier 14, whereby the total noise level for the engine E is reduced on the order of several decibels.

In view of the foregoing, it is believed to be readily apparent that the multiple pure tone elimination device provides a practical solution to the problems heretofore encountered in eliminating pure tone noise developed by larger jet engines, such as those employed as power plants for large transport aircraft.

What is claimed is:

1. A pure-tone elimination assembly adapted to be mounted upstream from the air intake for a jet engine characterized by a bladed rotor having operational tip speeds in the supersonic range, whereby the engine is further characterized by a forwardly projected rotating field of multiple pure-tone noise at operational speeds, comprising:
   A. a tubular cowl defining a duct for delivering an airstream axially into the air intake for said engine; and
   B. a plurality of struts for disrupting the continuity of a rotating field of multiple pure-tone components of noise comprising a plurality of flat, plate-like members arranged in mutually intersecting planes and having a line of intersection coincident with the longitudinal axis of said cowl.

2. A pure-tone sound elimination device as defined in claim 1 wherein said plurality of struts comprise at least four flat, plate-like members arranged in an intersecting configuration conforming to a cruciform and having an axis of intersection coincident with the longitudinal axis of said cowl.

3. A pure-tone sound elimination assembly, as defined in claim 2 having a dimension along said axis of intersection at least as great as the diametric dimension of said rotor.

* * * * *